US009768830B2

(12) United States Patent
Starr et al.

(10) Patent No.: US 9,768,830 B2
(45) Date of Patent: *Sep. 19, 2017

(54) METHOD AND APPARATUS FOR REDUCING NOISE IN A COMMUNICATION SYSTEM

(71) Applicants: AT&T INTELLECTUAL PROPERTY I, LP, Atlanta, GA (US); Adaptive Spectrum and Signal Alignment, Inc., Redwood City, CA (US)

(72) Inventors: Thomas Starr, Inverness, IL (US); Peter J. Silverman, Evanston, IL (US); George Ginis, Mountain View, CA (US)

(73) Assignees: AT&T Intellectual Property I, L.P., Atlanta, GA (US); Adaptive Spectrum and Signal Alignment, Incorporated, Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/144,082

(22) Filed: May 2, 2016

(65) Prior Publication Data

US 2016/0323014 A1 Nov. 3, 2016

Related U.S. Application Data

(63) Continuation of application No. 14/242,164, filed on Apr. 1, 2014, now Pat. No. 9,356,654, which is a (Continued)

(51) Int. Cl.
*H04B 3/32* (2006.01)
*H04B 3/487* (2015.01)
*H04B 7/04* (2017.01)

(52) U.S. Cl.
CPC ............... *H04B 3/32* (2013.01); *H04B 3/487* (2015.01); *H04B 7/046* (2013.01)

(58) Field of Classification Search
CPC ........... H04B 3/32; H04B 7/046; H04B 3/487
See application file for complete search history.

(56) References Cited

U.S. PATENT DOCUMENTS 8,073,135 B2 * 12/2011 Rhee .................... H04M 3/304
375/267
9,356,654 B2 * 5/2016 Starr ........................ H04B 3/32
(Continued)

OTHER PUBLICATIONS

"International Search Report PCT/US2010/024676", May 19, 2010, 4 pages.
(Continued)

*Primary Examiner* — Kenneth Lam
(74) *Attorney, Agent, or Firm* — Guntin & Gust, PLC; Robert Gingher

(57) ABSTRACT

A system that incorporates teachings of the present disclosure may include, for example, a controller to: determine crosstalk coupling characteristics between a plurality of lines of a digital subscriber line system connected to a plurality of modems based on a transition between a full power mode and one or more other modes, and provide the determined crosstalk coupling characteristics to one or more of the plurality of modems for performance of at least one of pre-coding a transmitted signal and processing a received signal along a line of the plurality of lines, where the pre-coding and processing is performed based at least in part on the determined crosstalk coupling characteristics, and where the pre-coding of the transmitted signal and the processing of the received signal reduce effects of fluctuating crosstalk. Other embodiments are disclosed.

20 Claims, 13 Drawing Sheets

Related U.S. Application Data continuation of application No. 12/402,339, filed on Mar. 11, 2009, now Pat. No. 8,730,785.

(56) References Cited

U.S. PATENT DOCUMENTS

| | | | |
|---|---|---|---|
| 2001/0004383 A1 | 6/2001 | Nordstrom et al. | |
| 2003/0185383 A1* | 10/2003 | Bergsagel | H04M 1/738 379/387.01 |
| 2005/0026572 A1* | 2/2005 | Dasgupta | H04B 3/487 455/114.2 |
| 2006/0029147 A1 | 2/2006 | Tsatsanis | |
| 2006/0109779 A1 | 5/2006 | Shah et al. | |
| 2007/0274404 A1* | 11/2007 | Papandriopoulos | H04B 3/32 375/260 |
| 2008/0188185 A1 | 8/2008 | Shi | |
| 2009/0073863 A1* | 3/2009 | Kondo | G11B 7/0053 369/275.4 |
| 2009/0073868 A1 | 3/2009 | Guenach et al. | |
| 2009/0180526 A1* | 7/2009 | Long | H04L 12/10 375/222 |
| 2009/0304056 A1* | 12/2009 | De Lind Van Wijngaarden | H04B 3/46 375/222 |
| 2012/0026908 A1 | 2/2012 | Tzannes et al. | |

OTHER PUBLICATIONS

Ginis, et al., "Vectored Transmission for Digital Subscriber Line Systems", IEEE Journal on Selected Areas in Communications, vol. 20, No. 5, XP011065493, Jun. 1, 2002.

* cited by examiner

300

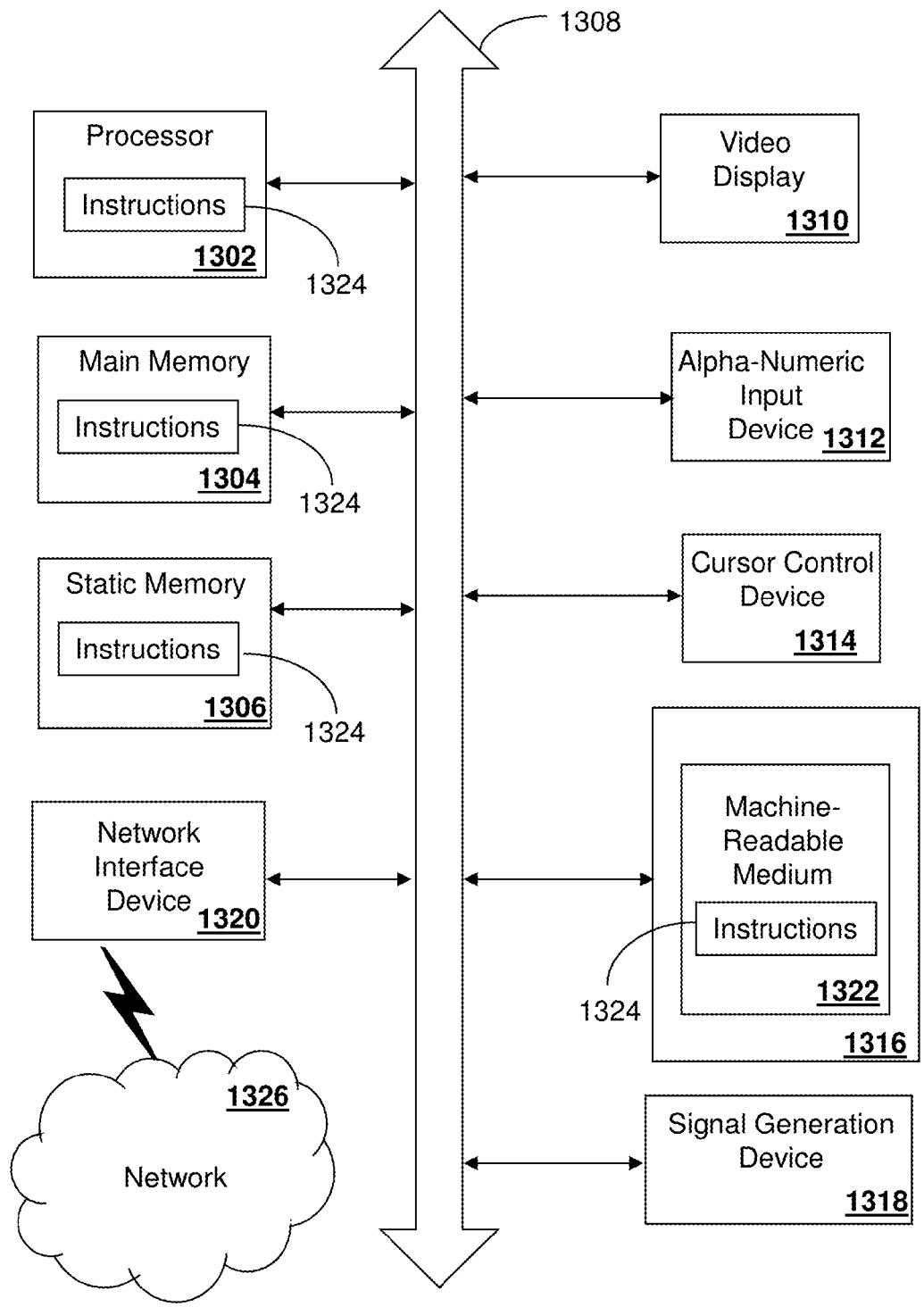
FIG. 13    1300

METHOD AND APPARATUS FOR REDUCING NOISE IN A COMMUNICATION SYSTEM

CROSS-REFERENCE TO RELATED APPLICATIONS

This application is a continuation of U.S. patent application Ser. No. 14/242,164 filed Apr. 1, 2014, which is a continuation of U.S. patent application Ser. No. 12/402,339 filed Mar. 11, 2009. All sections of the aforementioned application(s) are incorporated herein by reference in their entirety.

FIELD OF THE DISCLOSURE

The present disclosure relates generally to communication systems and more specifically to a method and apparatus for reducing noise in a communication system.

BACKGROUND

Communication systems consume large amounts of power and often employ power conservation methods. One such method is a reduced power mode of operation where a transmitted signal can be modified by reducing the amplitude of the signal during the times when data traffic has ceased or is relatively small. In a reduced power mode, the information provided over a connection can be limited, such as to information which is required to maintain a connection and synchronization between two communicating modems, while allowing the modems to exchange messages necessary to leave the low power mode and return to a normal transmission mode.

BRIEF DESCRIPTION OF THE DRAWINGS

FIG. 13 is a diagrammatic representation of a machine in the form of a computer system within which a set of instructions, when executed, may cause the machine to perform any one or more of the methodologies discussed herein.

DETAILED DESCRIPTION

Figure 1:
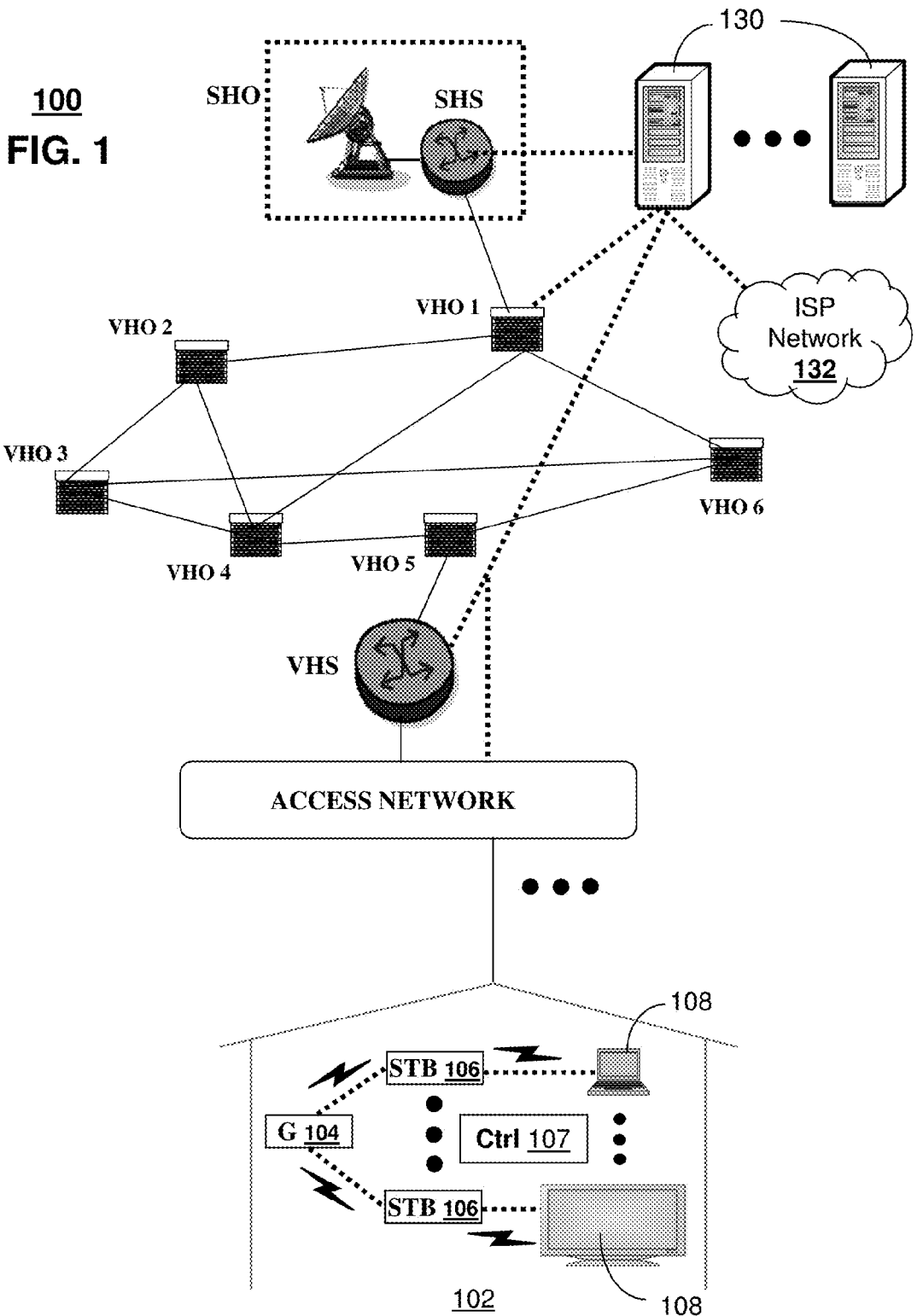
FIGS. 1-10 depict illustrative embodiments of communication systems that provide network communications.

One embodiment of the present disclosure can entail a computer-readable storage medium having computer instructions for monitoring a plurality of modems in a Digital Subscriber Line (DSL) system for transitioning between a full power mode and one or more other modes; determining crosstalk coupling characteristics between a plurality of lines of the DSL system connected to the plurality of modems based at least in part on changes in amplitude of transmitted signals where the amplitude changes result from the transition between the full power mode and the one or more other modes; and providing the determined crosstalk coupling characteristics to one or more of the plurality of modems for performance of at least one of pre-coding a transmitted signal and processing a received signal along a line of the plurality of lines, where the pre-coding and processing are performed based at least in part on the determined crosstalk coupling characteristics and temporal characteristics associated with the one or more other modes, and where the pre-coding of the transmitted signal and the processing of the received signal reduce effects of fluctuating crosstalk.

Another embodiment of the present disclosure can entail an apparatus comprising a controller to: determine crosstalk coupling characteristics between a plurality of lines of a Digital Subscriber Line (DSL) system connected to a plurality of modems; and provide the determined crosstalk coupling characteristics to one or more of the plurality of modems for performance of at least one of pre-coding a transmitted signal and processing a received signal along a line of the plurality of lines, where the pre-coding and processing are performed based at least in part on the determined crosstalk coupling characteristics, and where the pre-coding of the transmitted signal and the processing of the received signal reduce effects of fluctuating crosstalk.

Yet another embodiment of the present disclosure can entail a method including providing a full power mode and other modes of operation for modems in a Digital Subscriber Line (DSL) system; determining one or more first lines of a cable that will be effected by a change in a transmitted signal amplitude of a second line of the cable, where the first and second lines are connected to the modems in the DSL system; providing a transition time to one or more first modems that are connected to the first lines, where the transition time is a time when a second modem connected to the second line transitions between at least one of the full power mode to a second mode and the second mode to the full power mode; and adjusting an operating mode of the one or more first modems in proximity to the transition time to compensate for effects of fluctuating crosstalk.

Yet another embodiment of the present disclosure can entail a network device of a Digital Subscriber Line (DSL) system, where the network device comprises a controller to: transition between a full power mode and one or more other modes; receive crosstalk coupling characteristics associated with a plurality of lines of the DSL system, where the network device is connected to a line of the plurality of lines; and perform at least one of pre-coding a signal to be transmitted and processing a received signal, where the pre-coding and processing are performed based at least in part on the received crosstalk coupling characteristics, and where the pre-coding of the transmitted signal and the processing of the received signal reduce effects of fluctuating crosstalk.

Yet another embodiment of the present disclosure can entail a method including applying vectoring to one or more lines of a plurality of lines in a Digital Subscriber Line system to reduce effects of fluctuating crosstalk being experienced by the plurality of lines, where at least a portion of the plurality of lines transition between full power and low power modes.

Yet another embodiment of the present disclosure can entail providing a plurality of lines in a Digital Subscriber Line (DSL) system, where the plurality of lines are connected to modems, and where fluctuating crosstalk occurs in the plurality of lines based on at least a portion of the plurality of lines transitioning between a full power mode and one or more other modes; and applying vectoring to one or more lines of the plurality of lines to reduce effects of the fluctuating crosstalk being experienced by the plurality of lines.

FIG. 1 depicts an illustrative embodiment of a first communication system 100 for providing network communication, including delivering and receiving media content, data and so forth. The communication system 100 can represent an Internet Protocol Television (IPTV) broadcast media system, although various other types of network communication systems can be realized by the system. An access network can be provided that utilizes DSL connections (including various types such as ADSL, ADSL2plus, VDSL2, SHDSL, and so forth) with a commercial and/or residential building 102 for providing network communication, such as between one or more computing devices 108 and the Internet. The access network can include various network elements for facilitating the delivery of data, including a bank of digital subscriber line access multiplexers (DSLAMs) located in a central office or a service area interface that provides broadband services over copper twisted pairs to buildings 102.

In one embodiment, the system 100 can include an IPTV infrastructure, where there can be a super head-end office (SHO) with at least one super headend office server (SHS) which receives national media programs from satellite and/or media servers from service providers of multimedia broadcast channels. In the present context, media programs can represent audio content, moving image content such as videos, still image content, and/or combinations thereof. The SHS server can forward IP packets associated with the media content to video head-end servers (VHS) via a network of aggregation points such as video head-end offices (VHO) according to a common multicast communication method.

The VHS can then distribute multimedia broadcast programs via the access network to the commercial and/or residential buildings 102 housing a gateway 104 (such as a residential gateway or RG). The gateway 104 can distribute broadcast signals to media processors 106 such as Set-Top Boxes (STBs) which in turn present broadcast selections to media devices 108 such as computers or television sets managed in some instances by a media controller 107 (such as an infrared or RF remote control). Unicast traffic can also be exchanged between the media processors 106 and subsystems of the IPTV media system for services such as video-on-demand (VoD). It will be appreciated by one of ordinary skill in the art that the media devices 108 and/or portable communication devices 116 shown in FIG. 1 can be an integral part of the media processor 106 and can be communicatively coupled to the gateway 104. In this particular embodiment, an integral device such as described can receive, respond, process and present multicast or unicast media content.

The system 100 can be coupled to one or more computing devices 130, a portion of which can operate as a web server for providing portal services over an Internet Service Provider (ISP) network 132 to fixed line and/or wireless computing or media devices 108. Although not shown, various components of the communication system 100 can also be combined with or replaced by analog or digital broadcast distributions system components, such as cable TV system components.

Figure 2:
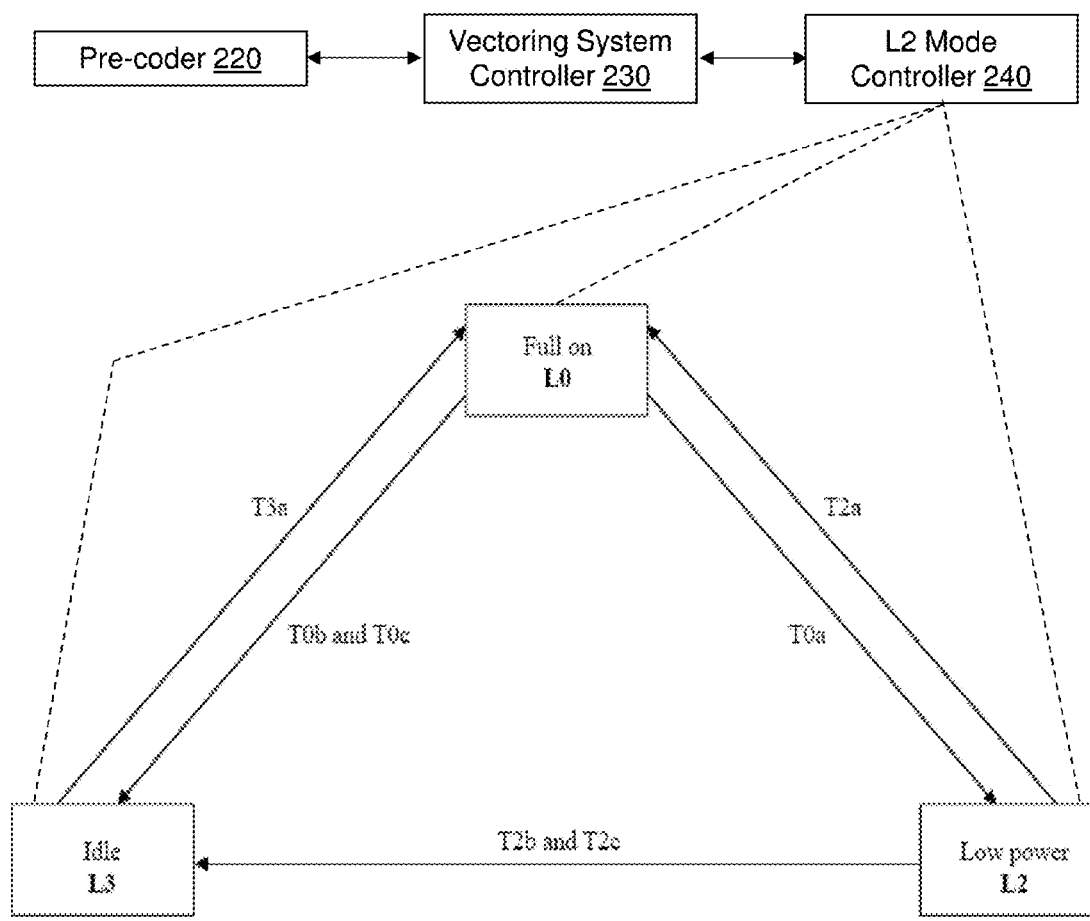

FIG. 2 depicts an illustrative embodiment where power mode changes occur in a communication system 200. In one embodiment, the system 200 can deliver media content, although various forms of network communication are contemplated, including data and voice. Communication system 200 can be overlaid or operably coupled with communication system 100 as another representative embodiment of said communication system. As shown, the system 200 can include a low power mode, which is the L2 power management mode, that reduces the power consumed by modems for periods of time when there is little or no traffic on the line, such as according to ITU-T Recommendation G.992.3 (ADSL2) and Recommendation G.992.5 (ADSL2plus). The present disclosure contemplates other power reduction techniques, protocols or standards being followed by system 200, including for other DSL technologies (such as G.993.2 for VDSL2). The normal power mode is the L0 mode, while the idle mode where the DSL connection is not established, is the L3 mode. System 200 can include a pre-coder 220, a vectoring controller 230, and L2 mode controllers 240. System 200 can reduce or eliminate the detrimental affects of fluctuating crosstalk caused by toggling between the L2 and L0 modes by applying vectoring to the respective lines as will be described again later.

During a reduced power mode of system 200, the transmitted signal can be modified by reducing the amplitude of the DSL signal during the times when data traffic sent by applications over the DSL connection is adequately small, thereby reducing the power consumed by the modem. For instance, the amplitude of each of the DMT tones can be reduced, including the number of data bits transmitted per tone. In one embodiment, the lowering of the power modes reduces the power transmitted into the line, thus reducing overall power used by the modem.

In one embodiment, application data sent over the network in system 200 may not be transmitted over the DSL connection while a transmitting and a receiving pair of modems is in L2 mode; instead the information encoded over the DSL connection may be solely that required to keep the connection between the two modems established and synchronized, while allowing the modems to exchange the messages required to leave the L2 mode and return to normal transmission when application data is again available for transmission. In another embodiment, low-bit-rate application data can be transmitted during the L2 mode, such as VoIP application data.

Figure 3:
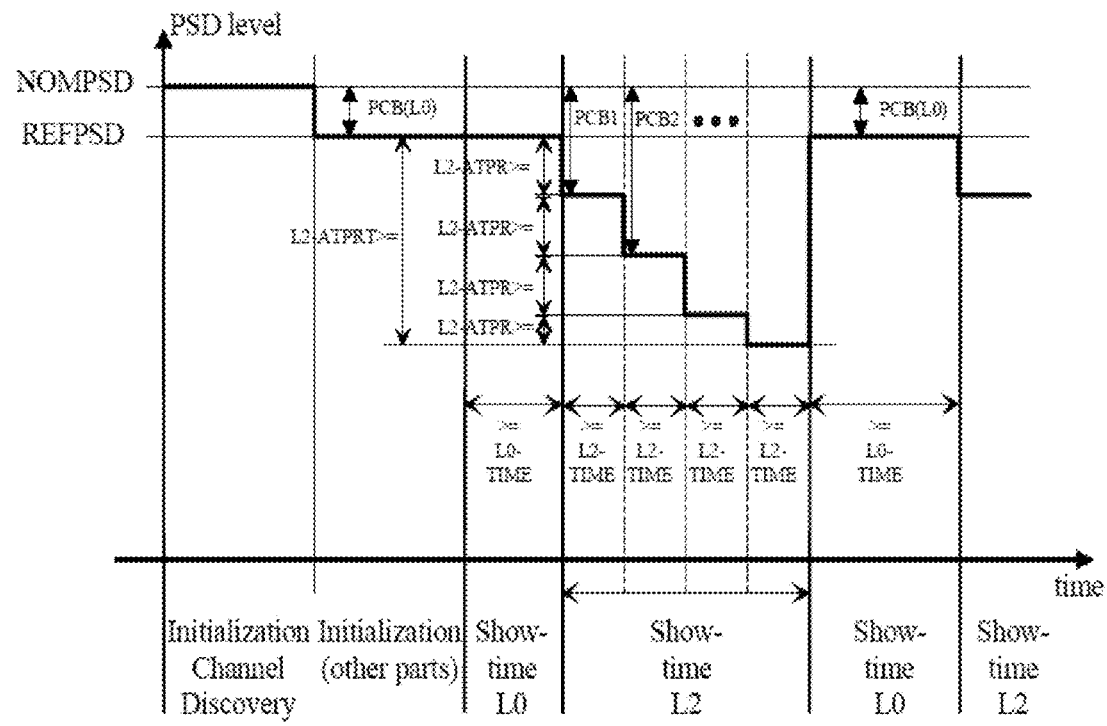

FIG. 3 depicts an illustrative embodiment of power reductions achieved during the showtime state, when a modem of another communication system 300 enters the L2 mode. Communication system 300 can be overlaid or operably coupled with communication systems 100-200 as another representative embodiment of said communication systems.

The DSL low power modes can enable a transmitting and receiving pair of modems supporting the DSL connection to enter and leave the mode very quickly when data traffic is not being transmitted over the DSL connection. The signal transmitted during the mode can keep the connection between the two modems established and synchronized, and the signal can return to full-power data transmission capabilities as soon as a high-bit-rate application makes such a request. Entering into the reduced power mode and leaving the mode can occur fast enough so that the application processes at each end of the connection dealing with the transferred data are not affected by the transitions from the L2 mode back to the L0 normal transmission mode.

As a result of the intermittent nature of data packets to and from the customer, the DSL may frequently transition between the full power (L0) and low power (L2) modes. These transitions between the L0 and L2 modes may occur as frequently as once every one or two seconds due to relatively short but frequent gaps in the user's data stream. Additionally these transitions into and out of the L2 mode can occur at varying and unpredictable intervals based solely on the specifics nature of the communications carried over the DSL connection. The occurrence of such transitions can be difficult to characterize or predict. Both of these characteristics of the L2/L0 transition can cause frequent fluctuations in the transmitted spectrum and signal level from a modem transitioning between the L0 the L2 mode. These changes can occur at various and unpredictable times.

Crosstalk is the resulting signal coupled to other lines in the cable, which will correspondingly fluctuate with the transitions between the L0 mode and the L2 mode. Receivers on the other DSL lines in a cable can see crosstalk as noise. Fluctuating crosstalk, which is known as non-stationary crosstalk, can be more disruptive to the decoding of the signal by the receiving DSL Modem than constant crosstalk because it is difficult for a receiver to adapt to the changing noise level.

Figure 4:
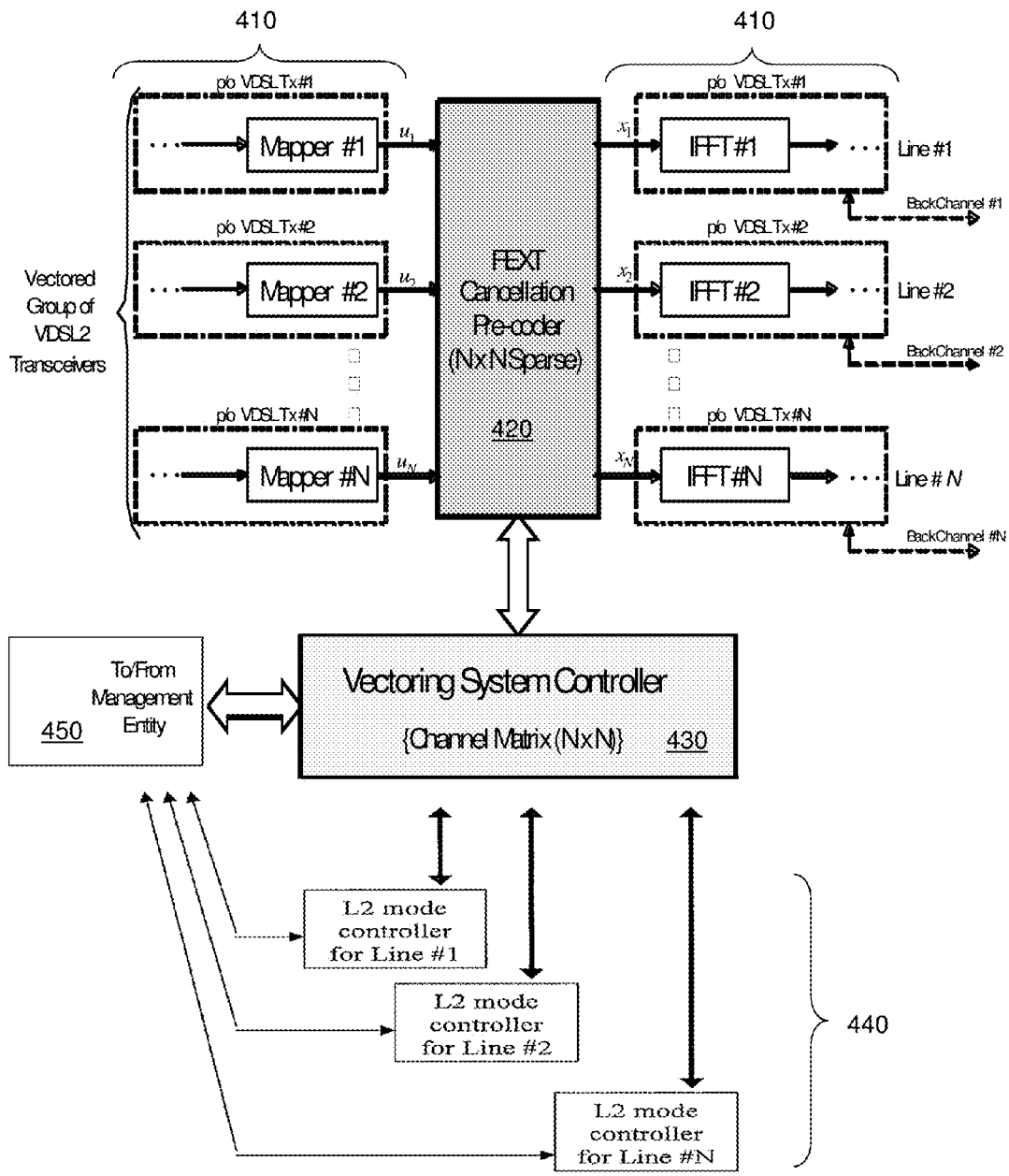

FIG. 4 depicts an illustrative embodiment of another communication system 400 for delivering media content. Communication system 400 can be overlaid or operably coupled with communication systems 100-300 as another representative embodiment of said communication systems. As shown, the system 400 can include a plurality of transceivers 410, a pre-coder 420 in communication with the transceivers, a vector controller 430, L2 mode controllers 440, and a management entity 450. System 400 can reduce or eliminate the detrimental affects of fluctuating crosstalk caused by toggling between the L2 and L0 modes by applying vectoring to the respective lines. For instance, non-stationary crosstalk caused by the power-saving L2 mode can be minimized by applying vectoring for ADSL, ADSL2plus, VDSL2, SHDSL modems connected to the lines in a cable.

In one embodiment, in order for the L2 mode to function, both the transmitting and the receiving DSL modem at either the DSLAM or the CPE can have advance knowledge of: time of entry in L2 mode and the corresponding Power Cut-Back (PCB) increase; time of application of a potential "power-trim" while in L2 mode and the corresponding PCB adjustment; and time of exit from L2 mode and the corresponding PCB decrease.

In another embodiment, the DSL modem can have knowledge of other parameters such as total transmitted power, Power Spectral Density (PSD), transmit spectrum scaling coefficients, fine gains per tone, bits per tone, and so forth, during the low-power mode and the full-power mode. In one embodiment, the knowledge is obtained by way of exchange of information between the transmitting and the receiving modem through an appropriate operations channel, and/or through the use of special symbols (such as sync flags in G.992.3). In another embodiment, the information about the time of change of the power and of the corresponding amount of change can be provided to the DSL modem modules related to vectoring in order to adjust their settings at the correct time given the expected changes.

System 400 can apply downstream vectoring for controlling crosstalk. For example, the Far End Crosstalk (FEXT) pre-coder 420 used in the downstream direction on the transmitter can modify the signal so that the non-stationary crosstalk will be largely canceled in the receiver. For instance, when an L2-related power change is about to occur for a line, the pre-coder 420 can receive a notification from the L2 mode controller of the corresponding line with regard to the expected time of the transition and the expected amount of power change.

Communication between the L2 controllers 440, the vectoring controller 430, and the Management Entity 450 allows coordination between the two types of controllers and the Management Entity. Communications from the L2 controllers 440 to the vectoring controller 430 can include time and power change associated with a transition event. Communication from the vectoring controller 430 to the L2 controllers 440 can allow the transitions from the L2 mode to coordinate with the vectoring processing and, for example, can be ACK, NACK, and/or other messages such as "Not ready", "Unable to adjust to change", and so forth. Communication from the L2 controllers 440 to the management entity 450 can be L2-related parameters, such as those already defined in the G.997.1 plus control, and reported parameters associated with L2-vectoring, such as enabling/disabling vectoring for each line, counts of the number of events of L2 transition events, success/failure codes, and so forth.

Figure 5:
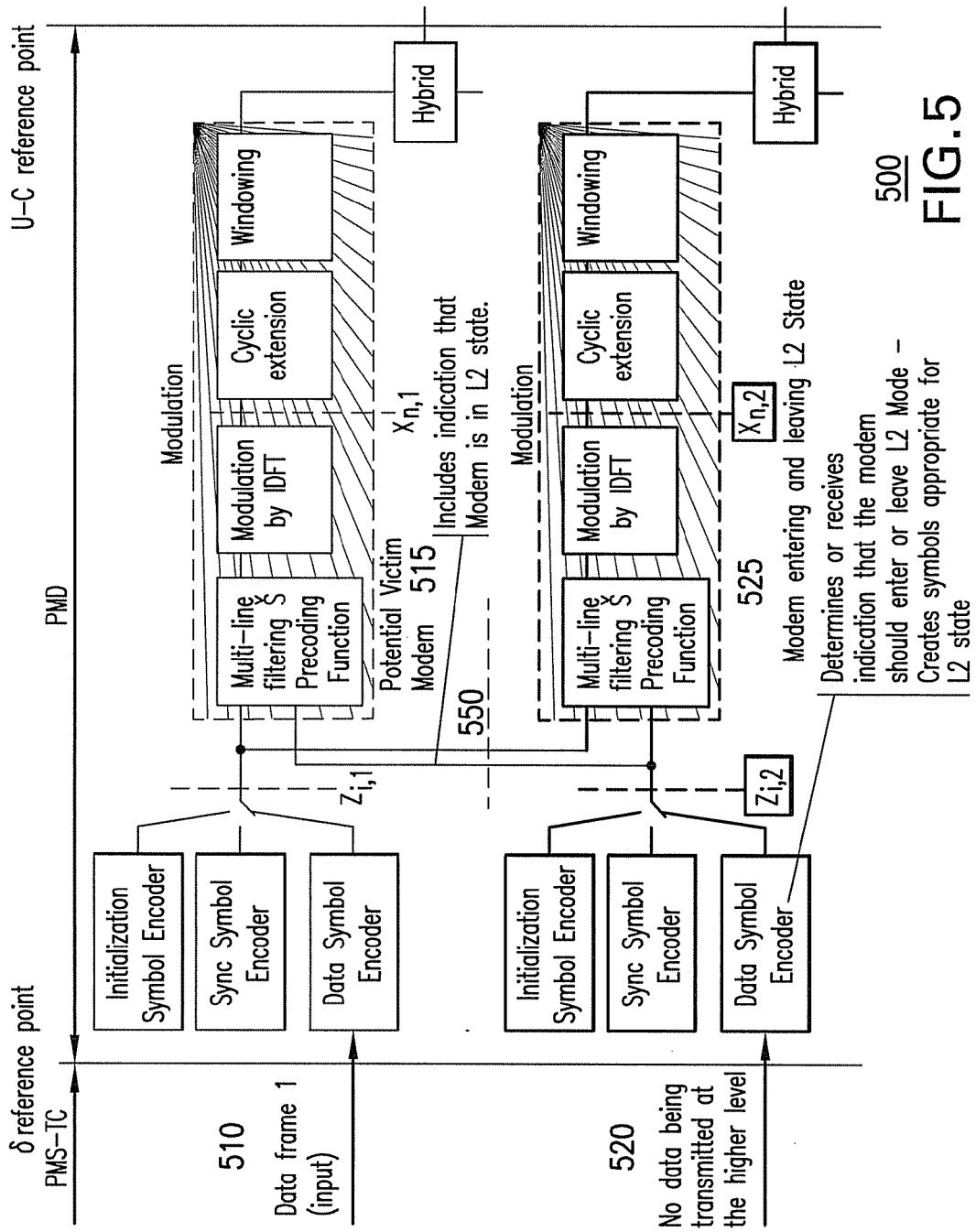

FIG. 5 depicts an illustrative embodiment of another communication system 500 for delivering media content and in particular illustrates the relation between the availability of application data for a particular line, entry into L2 mode on that line and communication flow between two lines that utilize vectoring in the downstream direction. Communication system 500 can be overlaid or operably coupled with communication systems 100-400 as another representative embodiment of said communication systems. System 500 includes transitions from and to the L2 mode which is functionally represented in FIG. 5. For simplicity, FIG. 5 illustrates the situation with two lines 510, 520 and their corresponding modems 515, 525, however it is extendable to situations where additional lines are vectored.

System 500 has a potential victim line 510 and a second line 520 entering and leaving the L2 mode because data is periodically unavailable for transmission from the applications communicating over the network. When line 510 enters the L2 mode, because there is no data available from the application, it indicates to the potential victim line 510 over the interface 550 that it has entered the L2 mode. The pre-coder function on the victim line 510 can be made aware of the coding and PSD of the L2 mode and can adjust the pre-coding of its own line to account for the change to the L2 mode. The pre-coding function for the line 520 entering and leaving the L2 mode can also modify the pre-coding of its own line to take into account the fact that the line is in L2 mode.

In system 500, when data is available, the modem 525 can leave the L2 mode and transition to the L0 normal transmission mode. The victim line 510 can be notified of this change and can be provided with the characteristics of the PSD and signal of the line in its new state over the interface 550 so that the victim line 510 can adjust its pre-coding to deal with the new situation. The exemplary embodiment of FIG. 5 illustrates downstream vectoring for two lines 510, 520, however the present disclosure can be extended to situations where there are additional lines in the vectoring group, with multiple victim lines and multiple lines entering and leaving the L2 mode.

Figure 6:
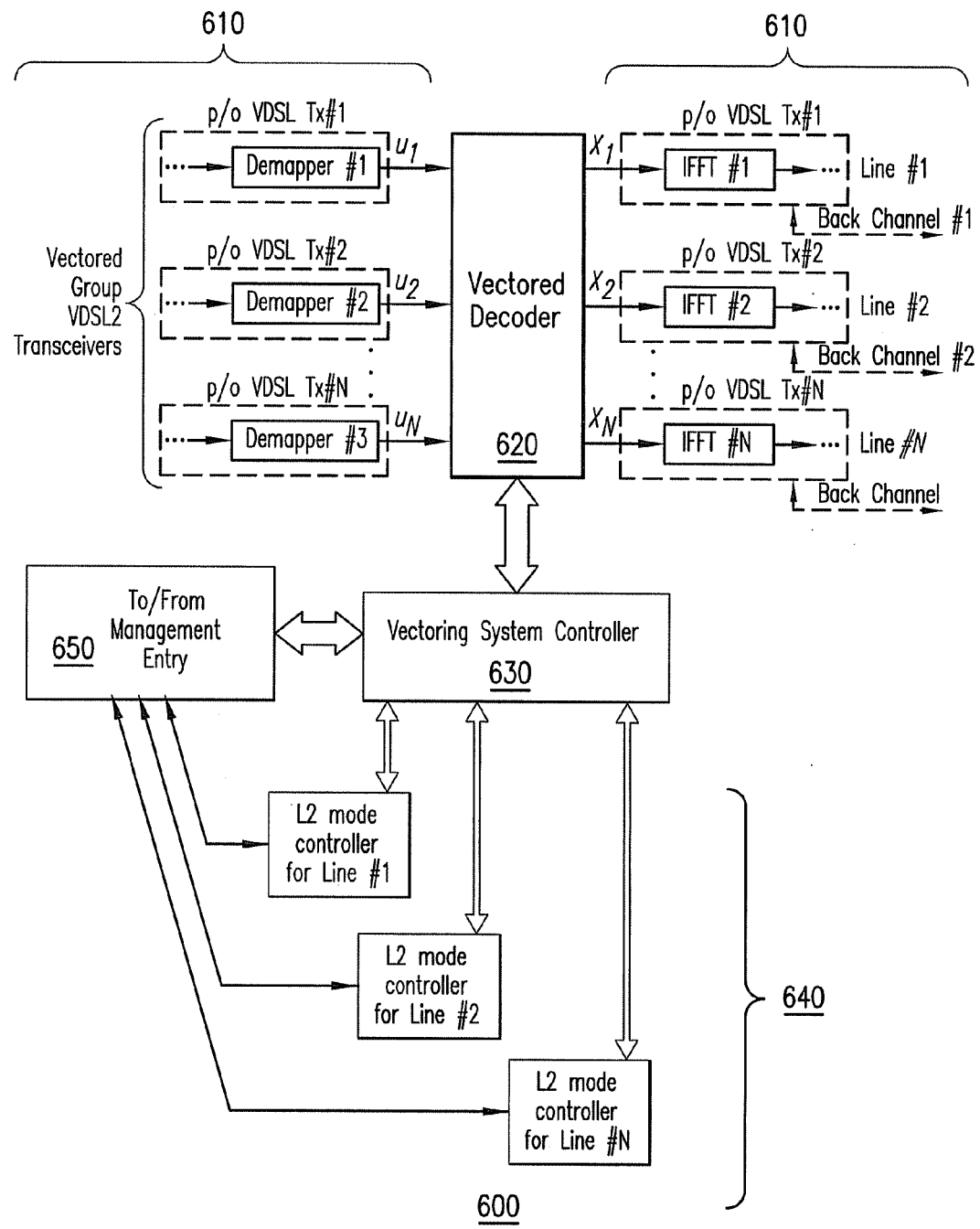

FIG. 6 depicts an illustrative embodiment of another communication system 600 for delivering media content. Communication system 600 can be overlaid or operably coupled with communication systems 100-500 as another representative embodiment of said communication systems. As shown, the system 600 can include a plurality of transceivers 610, a pre-coder 620 in communication with the transceivers, a vector controller 630, L2 mode controllers 640, and a management entity 650. System 600 provides for vectoring in the upstream direction to reduce or eliminate the detrimental affects of fluctuating crosstalk caused by toggling between the L2 and L0 modes.

In the upstream direction, communication between the L2 controllers 640, the vectoring controller 630, and the management entity 650 can allow coordination between the two types of controllers and the Management Entity. Communication from the L2 controllers 640 to the vectoring controller 630 can include time and power change associated with a transition event. Communication from the vectoring controller 630 to the L2 controllers 640 can allow the transitions from the L2 mode to be coordinated with the vectoring processing, including the use of ACK, NACK, and other messages such as "Not ready", "Unable to adjust to change", and so forth. Communication from the L2 controllers 640 to the management entity 650 can include providing L2-related parameters, such as those defined by the G.997.1 plus control, as well as reported parameters associated with L2-vectoring, such as enabling/disabling vectoring for each line, counts of the number of events of L2 transition events, and success/failure codes, and so forth.

Figure 7:
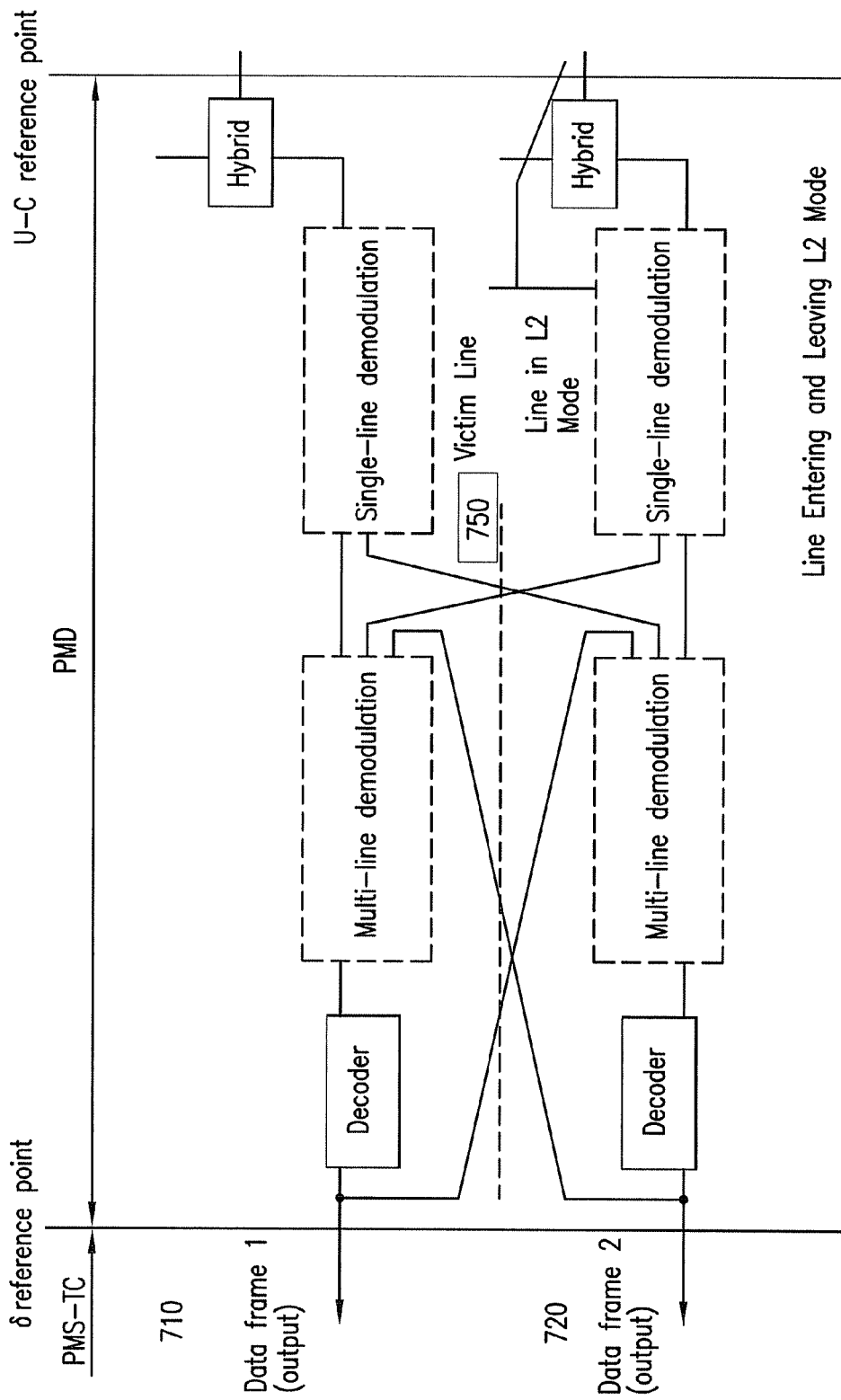

FIG. 7 depicts an illustrative embodiment of another communication system 700 for delivering media content and in particular illustrates the relationship between the availability of application data for a particular line at the receiver in the upstream direction, entry into L2 mode on that line and communications flows between two lines that utilize vectoring in the upstream direction. Communication system 700 can be overlaid or operably coupled with communication systems 100-600 as another representative embodiment of said communication systems. System 700 includes transitions from and to the L2 mode which is functionally represented in FIG. 7. For simplicity, FIG. 7 illustrates the situation with two lines 710, 720, however it is extendable to situations where additional lines are vectored.

In one embodiment, system 700 can employ vectoring in the upstream direction whereby the canceling function on the receiver can cancel non-stationary crosstalk produced by entry and exit into the L2 mode. A line can enter (and later leave) L2 mode when there is no high-bit-rate application operating over the link. When that line is in L2 mode, it can indicate to the victim line that it is in the L2 mode over the interface 750. The first line's multi-line decoding function is able to use the fact that itself is in the L2 mode. When application data is available, the first modem can detect that the line is no longer receiving the L2 mode and can transition to the L0 normal transmission mode. The victim line 710 can be notified of this change, and the characteristics of the PSD and signal of the line in its new state can be communicated to the victim line over the interface 750. The victim line 710 and the first line 720 can adjust their multi-line decoding functions to deal with the new situation. The exemplary embodiment of FIG. 7 illustrates upstream vectoring for two lines, but it can be extended to situations where there are additional lines in the vectoring group, multiple victim lines, and/or multiple lines entering and leaving the L2 mode.

Updating the pre-coder for upstream vectoring for an expected change in the transmitted power can be based on equation 1:

$$Y = H * X + N \quad [\text{Eq. 1}]$$

which is applied to each DMT tone, where: Y is the received data vector; H is the MIMO channel transfer function matrix; X is the vector of channel inputs; and N is the channel noise vector. For the upstream direction, a decoding process can include:

$$Y' = H^{-1} * Y = X + H^{-1} * N \quad [\text{Eq. 2}]$$

In the case of entry or exit from L2 mode, the power of X is about to change by a factor of A (where A is a diagonal matrix). The effect of this expected change in power can be undone or otherwise addressed at the receiver as follows:

$$Y' = H^{-1} * Y = A^{-1} * H^{-1} * (H * A * X + N) = X + H^{-1} * N \quad [\text{Eq. 3}]$$

$$Y' = A^{-1} * H^{-1} * Y = A^{-1} * H^{-1} * (H * A * X + N) = X + A^{-1} * H^{-1} * N \quad [\text{Eq. 4}]$$

When using downstream vectoring, updating of the precoder to address the power change introduced by entry into L2 mode depends on whether scaling to reduce the power in L2 mode is performed before or after the vectoring precoder operations. If L2 mode scaling is performed before the vectoring precoder, then it can be described as:

$$X' = A * X'' \quad [\text{Eq. 5}]$$

where X" is the mapper outputs (QAM constellation points), and A is a diagonal matrix representing the power change on entering or leaving L2 mode. Pre-coding can be represented by:

$$X = H^{-1} * X' \quad [\text{Eq. 6}]$$

And at the receiver:

$$Y = H * X + N = H^{-1} * A * X'' + N = A * X'' + N \quad [\text{Eq. 7}]$$

In this exemplary embodiment, the receiver can obtain samples that have been scaled by A. For example, the vectoring pre-coder may not need to be adjusted simultaneously with the L2 scaling application. However, if the L2 mode scaling is performed after the vectoring pre-coding, the vectoring pre-coder can be updated simultaneously with the application of L2 scaling. For instance, if the L2 scaling is described as:

$$X = A * X' \quad [\text{Eq. 8}]$$

then the vectoring pre-coding can be expressed as:

$$X' = B * X'' \quad [\text{Eq. 9}]$$

Thus, at the receiver, one obtains:

$$Y = H * X + N = H * A * X' + N = H * A * B * X'' + N \quad [\text{Eq. 10}]$$

If B is chosen to be:

$$B = A * H^{-1} * H^{-1} * A \quad [\text{Eq. 11}]$$

then the following result is obtained:

$$Y = A * X'' + N \quad [\text{Eq. 12}]$$

which means that the receiver obtains crosstalk-free samples that have been scaled by the diagonal matrix A, in accordance with L2 mode.

Figure 8:
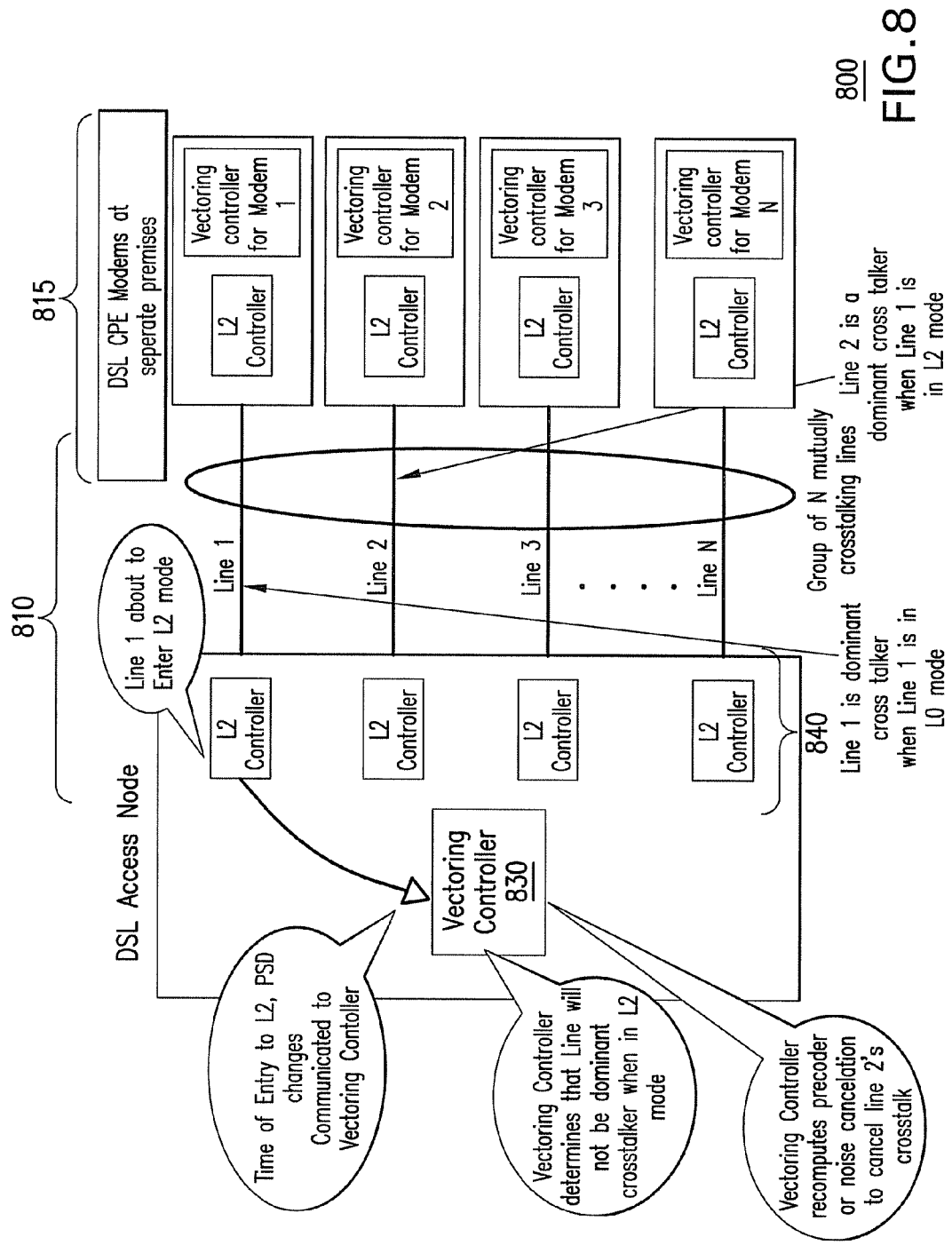

FIG. 8 depicts an illustrative embodiment of another communication system 800 for delivering media content. In particular, FIG. 8 is illustrative of the reassignment of vectoring group priorities when a line enters the L2 mode. Communication system 800 can be overlaid or operably coupled with communication systems 100-700 as another representative embodiment of said communication systems. As shown, the system 800 can include lines 810 that are capable of experiencing crosstalk, DSL modems 815 at user premises, vectoring controllers 830 and L2 mode controllers 840.

In one embodiment, where a smaller vectored group consists of a subset of lines in a cable/binder, the cancellation may not be complete. Signal processing speed constraints may limit cancellation to some subset of the lines causing crosstalk, with the preference being to cancel the worst offenders. System 800 can use information about both the L0 (normal transmission mode) crosstalk and the known effects of entering into L2 modes on other DSL Lines, in order to select a subset of lines (the vectoring group) on which noise cancellation is to be performed. The selection can be based on optimizing the canceling of the effects of entering and leaving L2 modes frequently.

In another embodiment, to reduce the amount of signal processing, vectoring systems can choose to cancel the crosstalk between only those wires with the greatest crosstalk coupling, and/or only at frequencies with the greatest crosstalk coupling. For example, system 800 can select the group of lines and the frequencies where vectoring would be performed based on the knowledge of lines in L0 mode; and lines in L2 mode and the associated power level.

When a first line is about to enter L2 mode, the vectoring controller 830 is notified of the time of the transition and of the power change. The vectoring controller 830 can calculate if the first line will continue being a dominant crosstalk source after entering L2 mode. If it is estimated that the crosstalk of a second line will be greater than the crosstalk of the first line after entering L2 mode, then the vectoring pre-coder or de-coder can be updated to cancel the crosstalk from the second line, instead of from the first line. The inverse operation may take place when the first line exits L2 mode at a later time.

Figure 9:
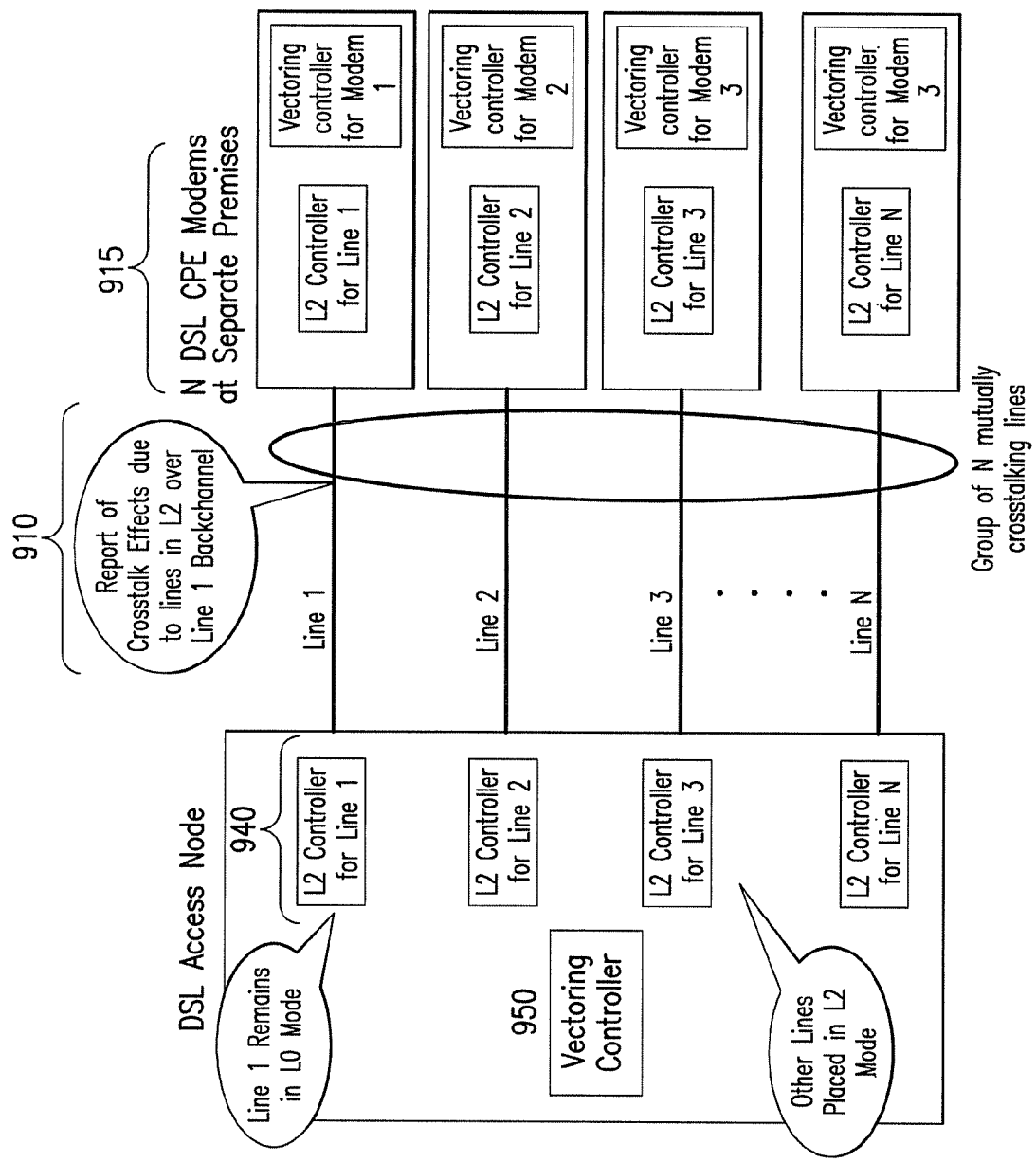

FIG. 9 depicts an illustrative embodiment of another communication system 900 for delivering media content. In particular, FIG. 9 illustrates the use of an L2 mode probe for determining the crosstalk coupling within a group of mutually crosstalking lines. Communication system 900 can be overlaid or operably coupled with communication systems 100-800 as another representative embodiment of said communication systems. As shown, the system 900 can include lines 910 that are capable of experiencing crosstalk, DSL modems 915 at user premises, vectoring controller 930 and L2 mode controllers 940.

In one embodiment, where the L2 signal is well characterized, since it is different from the signal sent during normal transmission, it can be sent at a time known to both the transmitter and the receiver. In another embodiment, the L2 signal can be used as a probe signal to facilitate determining the crosstalk coefficients between loops in the binder. In one embodiment, system 900 provides for vectored DSL systems learning the crosstalk coupling characteristics between every pair of wires in the cable. For instance, perturbations can be inserted into the transmitted signals and then the resulting impact in the signal-to-noise-ratio (SNR) in the other lines can be observed. Other techniques for learning or otherwise monitoring the crosstalk coupling characteristics can be utilized. In one embodiment, probe signals can be utilized that specify the DMT sync symbols to be encoded in specific ways that allow identification of the particular DSL service in the cable that is the source of the crosstalk received.

In one embodiment, a large change in the transmitted signal amplitude resulting from frequent transition between the full-power and low-power modes can serve as a probing signal to determine the crosstalk coupling characteristics between the pairs of wires in the cable. In another embodiment, the signal transmitted during the L2 mode can have characteristics specifically intended to improve its utility as a crosstalk probe signal, such as a distinctive PSD. As the modem transitions in and out of the low power mode, the resulting impact on SNR-vs-frequency can be observed for the modems connected to the other wire pairs in the cable.

System 900 provides for the following flow to be utilized to provide a probe signal for determining the crosstalk coupling between mutually crosstalking lines: the L2 controller 940 for each line on the access node can place each of the lines 2 through line N simultaneously in L2 mode for a period of time where line 1 remains in the L0 Mode; when a particular line is in L2, it can have the PSD characteristic of the L2 mode and each line in L2 mode can operate at reduced power; line 1 remains in L0 mode and can produce crosstalk on the other lines which are placed in L2 mode; the 'Vectoring Controller' on each CPE modem 915 for the lines 2 through N, which are placed in L2 mode, can analyze the signal received and report to the access node via a control channel (such as the 'back channel' or 'error channel') information about the received signal specifically including deviations from signal expected to be received if there were no crosstalk from Line 1 which is in L0 mode; reports of the differences for each of the lines affected by crosstalk from the line 1 in L0 mode can be made over the backchannel to the vectoring controller 930 on the access node; since the vectoring controller is aware of the specific PSD and other characteristics of both the lines in L2 mode and Line 1 in L0 mode, it can use the information about the reported deviations in the received signal for each line to determine the crosstalk coupled into the affected lines by the Line 1; and/or the lines 2 through N in L2 mode can be taken out of the L2 mode and placed in the normal transmission of L0 mode.

This process can be repeated, in or out of sequence, for each of the N lines, each of which can be placed in the L0 mode while all the other lines are placed for a period of time in L2 mode and the crosstalk from the line remaining in L0 mode is determined. Through this iterative process, the complete crosstalk coupling matrix for the entire group of mutually crosstalking lines can be determined.

Figure 10:
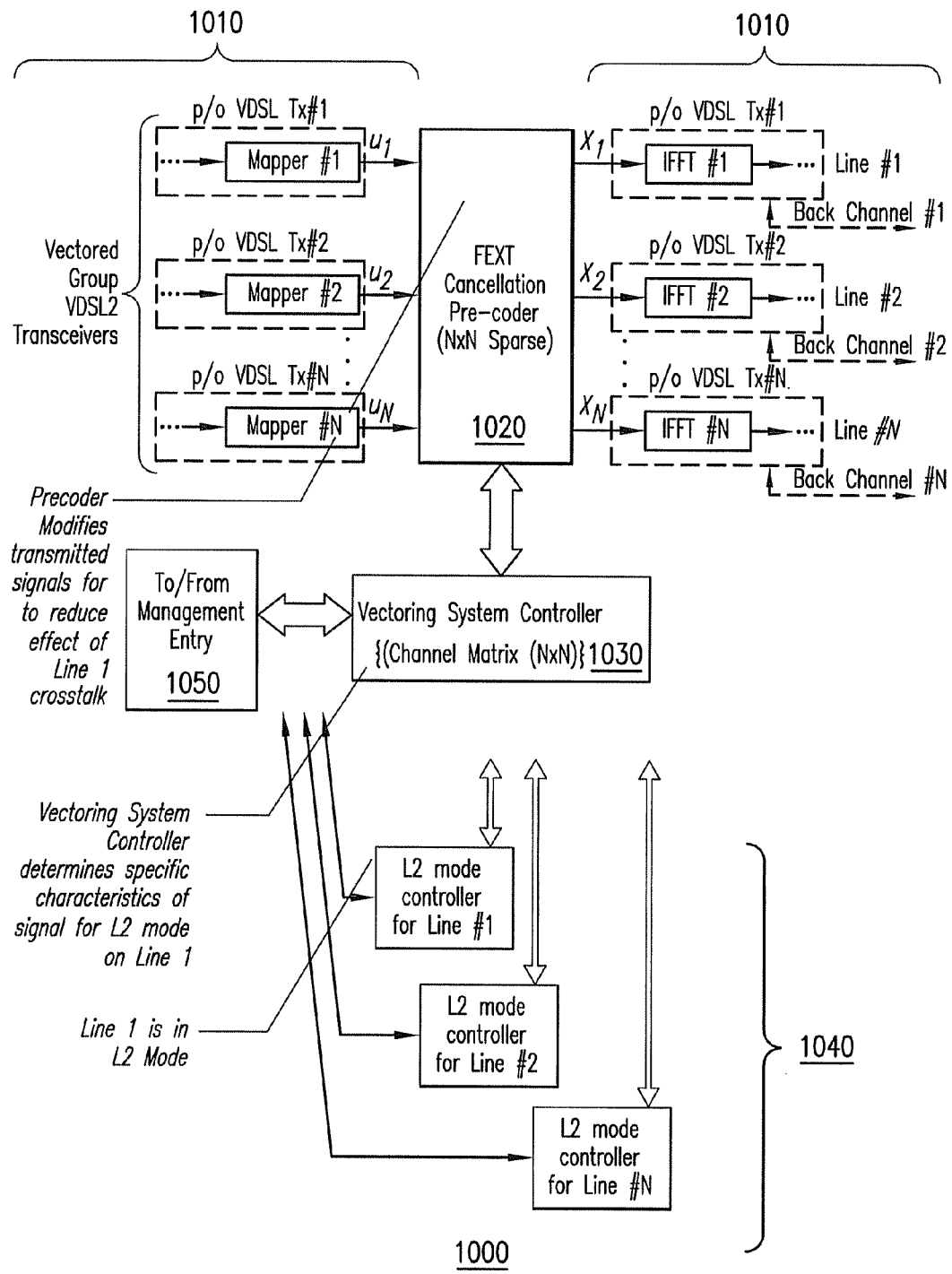

FIG. 10 depicts an illustrative embodiment of another communication system 1000 for delivering media content. In particular, FIG. 10 illustrates optimizing the L2 mode signal to reduce crosstalk into other lines. Communication system 1000 can be overlaid or operably coupled with communication systems 100-900 as another representative embodiment of said communication systems. As shown, the system 1000 can include a plurality of receivers 1010, a pre-coder 1020 in communication with the transceivers, a vector controller 1030, L2 mode controllers 1040, and a management entity 1050.

When vectoring techniques are used on a line in L2 mode, the PSD and other specific attributes for the L2 state can be modified by vectoring techniques such as pre-coding in the downstream direction or noise cancellation in the upstream relative to the L0 PSD to specifically reduce the effects of non-stationary crosstalk into victim lines. For example, the vectoring controllers can ensure a choice of the details of L2 PSD with the goal of keeping a vectoring group smaller to minimize the computational complexity.

For example, using vectoring for full power mode, the characteristics of the signal sent during the full power mode can be modified to minimize the effects of crosstalk. The specific modification to the signal can be based on the specific crosstalk coupling determined for the other wire pairs with the greatest crosstalk coupling. In one embodiment, the characteristics of the signal transmitted during the low-power mode can also be altered in a manner similar to the manner applied for vectoring during the full-power mode. In another embodiment, the characteristics of the signal sent during the low power mode can be modified, based on the determined crosstalk coupling, to minimize the apparent change in the crosstalk to the other lines in the cable that would be most susceptible to the crosstalk. This can result in modifying the signal transmitted in the low-power mode to have a greater or lesser apparent crosstalk to the other most susceptible wires. The transmitted amplitude-versus-frequency and the transmitted phase-vs-frequency can be modified for this purpose.

In system 1000, when line 1 is placed in L2 mode by the L2 mode controller 1040 for line 1, it can indicate to the vectoring system controller 1030 that the line is to enter L2 mode. The vectoring system controller 1030 can then determine the appropriate characteristics of the L2 signal on line 1 that will result in reduced cross-talk from line 1 into the other DSL lines. The Pre-coder 1020 and other transmit functions for line 1 can then be configured to bring into effect this optimized transmit signal. In one embodiment, the vectoring system controller 1030 can configure the transmit signal for line 1 in L2 mode to reduce the crosstalk effects not only into lines under control of the vectoring system controller, but also into other lines that are not under control of the vectoring system controller. These other lines may not be vectored to cancel the crosstalk and may still experience crosstalk from line 1.

In one embodiment, the system 1000 can continuously monitor the effects on SNR-vs-frequency on other lines as a line changes between the full-power and low-power modes. In the event that the methods to cancel the effect of crosstalk are unable to adequately eliminate the effects of fluctuating crosstalk on other lines, the system 1000 can disable the low-power mode for selected lines to assure the best performance for other lines.

In another embodiment, the back channel can provide ongoing monitoring about the crosstalk introduced by other lines into a particular DSL line. This information can be combined with information, such as SNR-vs-frequency, and other information associated with the DSL connection, such as counts of incorrectly received DMT symbols, known as code violations or CV's, to determine if the methods to cancel the effect of non-stationary crosstalk produced by L2 modes is adequate to ensure that the DSL service is of acceptable quality. In one embodiment, if uncorrectable degradation due to L2-mode-induced non-stationary crosstalk is detected, the L2 mode controller for a particular DSL line can be instructed to suppress transitions into L2 mode. In this example, the modem can remain in L0 mode even in cases where application level data is not available for transport. Although the benefits of L2 mode for expended power savings may be lost, the effects of non-stationary crosstalk can be avoided in this case where vectoring techniques are unable to ameliorate the effect.

Figure 11:
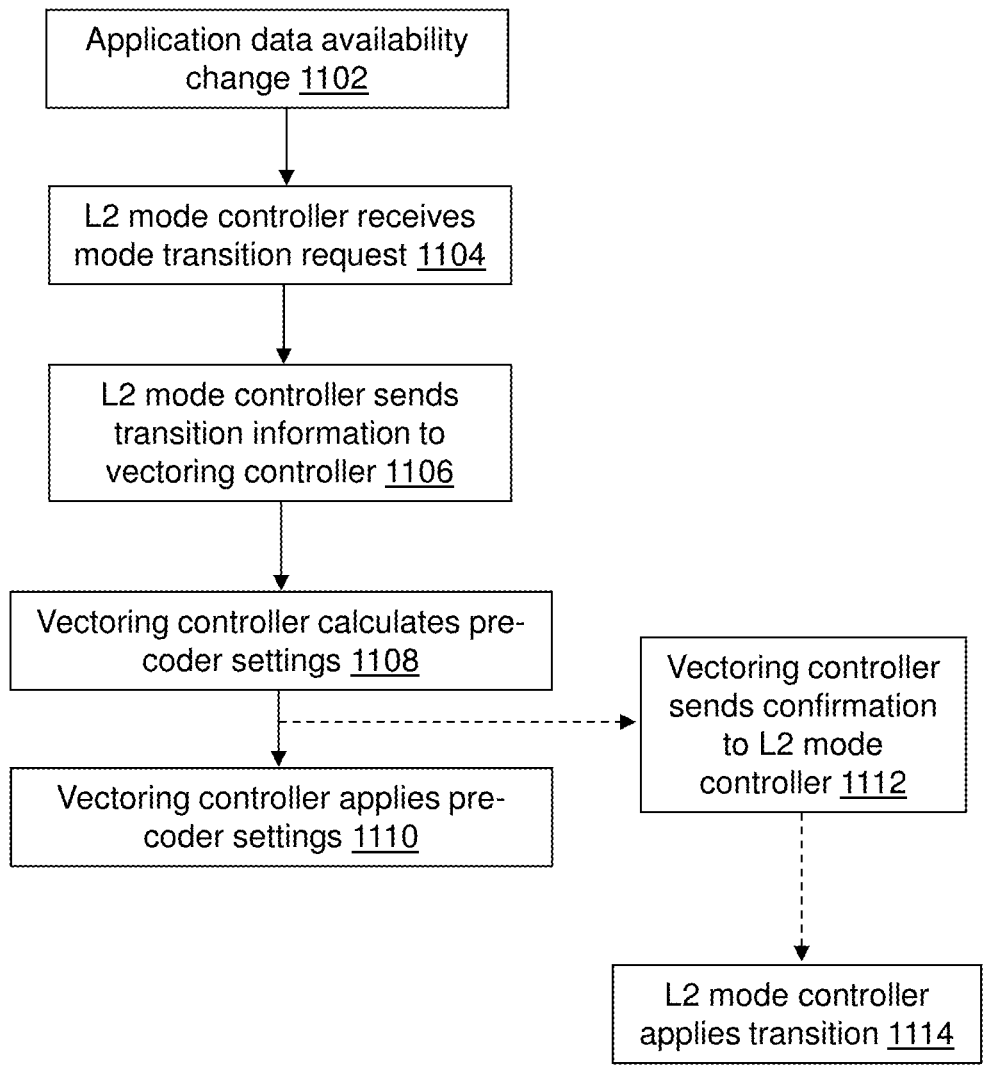
FIGS. 11-12 depict illustrative embodiments of methods operating in portions of the communication systems of FIGS. 1-10.

FIG. 11 depicts an illustrative method 1100 operating in portions of communication systems 100-1000. In particular, method 1100 describes downstream vectoring when a L2 mode transition occurs. Method 1100 begins with step 1102 in which a change in application data availability for a particular line occurs. In step 1104, the L2 mode controller for the line can receive a request for L2 mode transition. For example, the request can include entry, power trim and/or exit information. In one embodiment, the request can include time of transition and/or expected power change.

In step 1106, the L2 mode controller for the line can send information to the vectoring controller regarding the expected transition, expected time, and/or expected power change. In step 1108, the vectoring controller can calculate new pre-coder settings based on the received information associated with the power change. The vectoring controller can in step 1110 apply the new pre-coder settings at the expected times. In one embodiment in step 1112, the vectoring controller can send confirmation to the L2 mode controller. The L2 mode controller can then apply the L2 transition at the expected time in step 1114.

Figure 12:
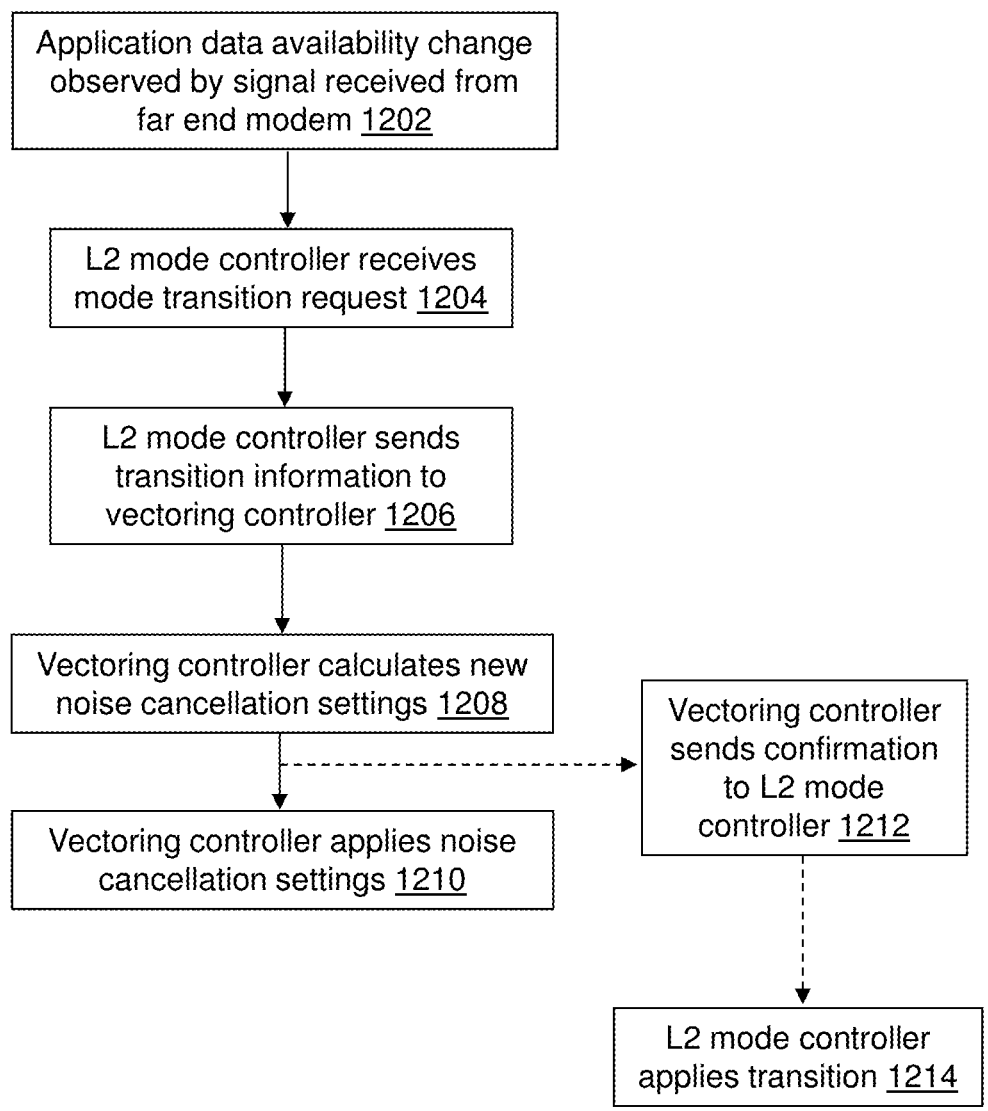

FIG. 12 depicts an illustrative method 1200 operating in portions of communication systems 100-1000. In particular, method 1200 describes upstream vectoring when a L2 mode transition occurs. Method 1200 begins with step 1202 in which a change in application data availability for a particular line occurs. The change can be observed by a signal received from a far end modem and/or at the U-C interface. In step 1204, the L2 mode controller for the line can receive a request for L2 mode transition. For example, the request can include entry, power trim and/or exit information. In one embodiment, the request can include time of transition and/or expected power change.

In step 1206, the L2 mode controller for the line can send information to the vectoring controller regarding the expected transition, expected time, and/or expected power change. In step 1208, the vectoring controller can calculate new noise cancellation settings based on the received information associated with the power change. The vectoring controller can in step 1210 apply the new noise cancellation settings at the expected times. In one embodiment in step 1212, the vectoring controller can send confirmation to the L2 mode controller. The L2 mode controller can then apply the L2 transition at the expected time in step 1214.

The exemplary embodiments can provide for the use of vectoring techniques in the downstream direction where the transmitting modem uses the information that it has available about the characteristics of the L2 signal, and the time of entry and exit from the L2 state in pre-coding the transmitted signal to allow the cancellation of crosstalk and minimize the detrimental affects of the non-stationary crosstalk caused by toggling between the L2 and L0 modes. The exemplary embodiments described herein provide for the use of vectoring techniques in the upstream direction where the receiving modem uses the information that it has available about the characteristics of the L2 signal, and the time of entry and exit from the L2 state in processing the transmitted signal to allow the cancellation of crosstalk in the received signal and minimize the detrimental affects of the non-stationary crosstalk caused by toggling between the L2 and L0 modes.

The exemplary embodiments can provide for the use of information about the characteristics of the transmitted signal during L2 mode, in addition to the L0 mode, by a DSL modem implementing vectoring techniques to optimize the selection of the lines that are included in a vectoring group where the vectoring group is made of fewer than all the DSL lines supported on a cable. The exemplary embodiments described herein provide for the use of the DSL signal sent during L2 mode as a probe signal to allow the determination of crosstalk coupling between lines in the cable in order to support vectoring techniques. However, the present disclosure contemplates the use of various techniques and/or components for determining crosstalk coupling characteristics. These techniques can be performed in combination with monitoring for power mode transitioning of the modems or can be performed independently of monitoring of the power mode transitions.

The exemplary embodiments can provide for the use of the information on the crosstalk coupling between DSL loops in a cable to adjust the characteristics of the signal transmitted by a modem in the L2 mode to lessen the effect of any non-stationary crosstalk produced by entry into L2 mode. These exemplary embodiments can be in coordination with the use of vectoring noise cancellation techniques by the modems on the line and/or can be used independently of the implementation of vectoring by those modems.

The exemplary embodiments can provide for the use of these techniques for any situation where DSL modems enter transmission states which entail the use of characteristic PSDs and signals known to the modems solely by the fact that they are in the state and produce non-stationary crosstalk into victim lines. The exemplary embodiments described herein are applicable to ADSL, ADSL2, VDSL2, SHDSL or any other DSL that could be affected by non-stationary crosstalk. The exemplary embodiments described herein provide for the use of the signal between two DSL modems when they enter or leave an L2 or similar state to trigger the use of these techniques.

The exemplary embodiments are applicable to determine when L2 mode should be disabled on a particular line that is affecting other lines with non-stationary crosstalk because the invention is unable to compensate for the effect of such crosstalk on the victim lines. For instance, the exemplary embodiments described herein can monitor of the stability of a DSL connection, by examining coding errors and SNR margin on the received modem of modems victimized by non-stationary crosstalk from a particular line entering L2 mode.

The exemplary embodiments can perform vectoring in the downstream direction, such as from the central office or remote terminal toward the customer, whereby transmitters apply pre-coding to adjust the transmitted symbols to minimize the effects of crosstalk into the other lines. The transmitter pre-coding can adjust various characteristics of the signal, including the amplitude-vs-frequency and phase-vs-frequency, to minimize the effects of crosstalk to the other lines. The exemplary embodiments can also perform vectoring in the upstream direction, such as from the customer premises towards the central office or remote terminal, whereby the effects of crosstalk are compensated from victim lines in the DSL receiver using knowledge of crosstalk coupling between lines and information, such as amplitude-vs-frequency and phase-vs-frequency of the mutually interfering DSL lines.

Upon reviewing the aforementioned embodiments, it would be evident to an artisan with ordinary skill in the art that said embodiments can be modified, reduced, or enhanced without departing from the scope and spirit of the claims described below. For example, the techniques of the exemplary embodiments can be used in other situations where non-stationary crosstalk is induced in other DSL lines in a cable by a DSL connection. For instance, the exemplary embodiments are applicable to DSL modem pairs that go into a state that has a special PSD which is characteristic of the state, where the PSD of the transmitting modem in the special state is characterized and the characteristics are known to both modems in the connection due to the fact the modems are capable of signaling each other that the modems are in the special state. As another example, the exemplary embodiments are applicable to DSL modem pairs that go into a state where entry into and out of the state occurs relatively frequently and with a difficult to characterize frequency so that the changes in the transmitted signal's PSD induces non-stationary crosstalk in other DSL lines in the cable. These situations can occur in a number of situations with both standard and proprietary DSL implementations. For example, the exemplary embodiments are applicable to the 'SOS' rapid change of aggregate bit-rate described in ITU-T SG 15/Q 4 contributions, and specified in Amendment 3 to ITU-T G.993.2. The 'SOS' modes are designed to allow a pair of DSL modems to rapidly adapt to changes in the noise environment on the line. In order to utilize an SOS mode the pair of modems making up a DSL connection pre-negotiate one or more configurations of bit loading, fine-gains, and TSS values which can be substituted rapidly for the configuration which the pair has configured for normal operation. Should a period of noise on the line occur, such as that produced by electrical noise, such as an electric motor starting at the customer's premises, which disrupts the DSL frames for the normal configuration, the modems communicate with each other over a robust internal communication channel as to which of the pre-negotiated substitute SOS configuration is to be used to maintain the connection under the degraded conditions. The modems then use the chosen pre-negotiated configuration immediately. Although the DSL lines sync rate will be lower when an SOS mode is invoked, it will continue to operate, as the pre-negotiated SOS configuration is one where the transmission characteristics more closely match the noise conditions currently on the line. When the period of increased noise ends, the modems will share information over the robust internal communications channel and can revert to the original higher rate configuration of the DSL connection. Since the SOS configurations on a line have different configurations of the DMT tones from the normal operating configuration for the connection, the PSD on the line at various frequencies may be different between the normal configuration and an SOS configuration. This change results in fluctuating crosstalk radiated into other lines in the cable or cable/binder both when the SOS mode is initiated and when it is terminated. As the SOS modes are meant to be initiated and terminated very rapidly in order to preserve as much data capacity on a DSL connection as possible, the fluctuations in crosstalk into other lines can also occur rapidly. Unlike the L2 power savings mode which is triggered by a period where there is no application data to transmit over the DSL connection, SOS modes occur during normal transport of application data but where noise affects the Physical Layer of the DSL connection and renders it temporarily unfit to transmit the application data at the originally configured Physical Layer sync rate. However entering or leaving SOS shares with entering or leaving L2 the following two qualities. First entering or leaving an SOS configuration will rapidly change the crosstalk effects into other lines in the cable/binder. Second, the characteristics of the new configuration, and thus its PSD and effect on other lines in the cable/binder is known in advance to both the transmitting and receiving modem. Because of these two characteristics, the techniques described for this invention or used with L2 mode can be readily adapted by one skilled in the art to SOS modes to ameliorate the effect of the changing crosstalk caused by a DSL line entering an SOS mode.

The present disclosure contemplates applying other techniques in combination with the vectoring techniques described herein, including setting the Signal to Noise Ratio Margin, the transmit Power Spectral Density (PSD), and/or the allocation of power and bits among the DMT tones that make up the DSL signal, such that the receiver can withstand a potential increase of the noise. The exemplary embodiments also contemplate providing the receivers with adaptive mechanisms for monitoring the noise and for responding to noise changes such as On-Line Reconfiguration operations, including bit-swapping.

Other suitable modifications can be applied to the present disclosure without departing from the scope of the claims below. Accordingly, the reader is directed to the claims section for a fuller understanding of the breadth and scope of the present disclosure.

FIG. 13 depicts an illustrative diagrammatic representation of a machine in the form of a computer system 1300 within which a set of instructions, when executed, may cause the machine to perform any one or more of the methodologies discussed above. In some embodiments, the machine operates as a standalone device. In some embodiments, the machine may be connected (using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1300 may include a processor 1302 (such as a central processing unit (CPU)), a graphics processing unit (GPU, or both), a main memory 1304 and a static memory 1306, which communicate with each other via a bus 1308. The computer system 1300 may further include a video display unit 1310 (such as a liquid crystal display (LCD)), a flat panel, a solid state display, or a cathode ray tube (CRT)). The computer system 1300 may include an input device 1312 (such as a keyboard), a cursor control device 1314 (such as a mouse), a disk drive unit 1316, a signal generation device 1318 (such as a speaker or remote control) and a network interface device 1320.

The disk drive unit 1316 may include a computer-readable medium 1322 on which is stored one or more sets of instructions (such as software 1324) embodying any one or more of the methodologies or functions described herein, including those methods illustrated above. The instructions 1324 may also reside, completely or at least partially, within the main memory 1304, the static memory 1306, and/or within the processor 1302 during execution thereof by the computer system 1300. The main memory 1304 and the processor 1302 also may constitute computer-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1324, or that which receives and executes instructions 1324 from a propagated signal so that a device connected to a network environment 1326 can send or receive voice, video or data, and to communicate over the network 1326 using the instructions 1324. The instructions 1324 may further be transmitted or received over a network 1326 via the network interface device 1320.

While the computer-readable medium 1322 is shown in an example embodiment to be a single medium, the term "computer-readable medium" should be taken to include a single medium or multiple media (such as a centralized or distributed database, and/or associated caches and servers) that store the one or more sets of instructions. The term "computer-readable medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a computer-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (such as TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
receiving, by a modem of a subset of a plurality of modems, crosstalk coupling characteristics between a plurality of lines of a digital subscriber line system connected to the plurality of modems, wherein the subset of the plurality of modems corresponds to a subset of the plurality of lines that are selected based on lines of a cable with a greatest crosstalk coupling and frequencies with the greatest crosstalk coupling, wherein the crosstalk coupling characteristics are based on a change in a transmitted signal amplitude determined according to measurements at neighboring lines of the plurality of lines when one of the plurality of modems connected to one of the plurality of lines is in a full power mode and other modems of the plurality of modems connected with the neighboring lines are in a low power mode, wherein a determining of the crosstalk coupling characteristics comprises repeating the measurements for each of the plurality of modems in the full power mode; and
pre-coding, by the modem, a transmitted signal based on the crosstalk coupling characteristics and temporal characteristics associated with the low power mode.

2. The method of claim 1, wherein the crosstalk coupling characteristics are not determined based on monitoring changes to signal-to-noise ratio-vs-frequency information associated with other lines of the plurality of lines.

3. The method of claim 1, wherein the pre-coding utilizes a multiple-input multiple-output channel transfer matrix.

4. The method of claim 3, further comprising processing, by the modem, a received signal along a line of the plurality of lines, wherein the processing is performed based on the crosstalk coupling characteristics and the temporal characteristics associated with the low power mode, and wherein the processing of the received signal reduces effects of fluctuating crosstalk.

5. The method of claim 1, wherein the pre-coding of the transmitted signal is for a transmission during the low power mode, the low power mode including a save our showtime mode, and further comprising receiving instructions for adjusting settings for a transmit power spectral density and an allocation of power and bits among tones of the transmitted signal, wherein the adjusting is based on a noise threshold.

6. The method of claim 1, wherein the pre-coding is according to $Y=H*X+N$, wherein Y is a received data vector, wherein H is a multiple-input multiple-output channel transfer matrix, wherein X is a vector of channel inputs, and wherein N is a channel noise vector.

7. The method of claim 1, further comprising receiving an instruction for disabling the low power mode based on an identification of a reduction in fluctuating crosstalk for the digital subscriber line system.

8. The method of claim 7, wherein the reduction of fluctuating crosstalk is determined based on coding errors.

9. A system comprising:
a memory that stores computer instructions; and
a processor coupled with the memory, wherein the processor, responsive to executing the computer instructions, performs operations comprising:
determining crosstalk coupling characteristics between a plurality of lines of a digital subscriber line system connected to a plurality of modems that transition between a full power mode and a low power mode, wherein the crosstalk coupling characteristics are determined based on a change in a transmitted signal amplitude that results from multiple transitions between the full power mode and the low power mode of a modem of the plurality of modems, wherein the change in the transmitted signal amplitude is determined by performing measurements at neighboring lines of the plurality of lines when one of the plurality of modems connected to one of the plurality of lines is in the full power mode and other modems of the plurality of modems connected with the neighboring lines are in the low power mode, wherein the determining of the crosstalk coupling characteristics comprises repeating the performing of the measurements for each of the plurality of modems in the full power mode;
providing the crosstalk coupling characteristics to the modem of the plurality of modems for performance of pre-coding a transmitted signal, the pre-coding being performed based on the crosstalk coupling characteristics, wherein the pre-coding of the transmitted signal reduces effects of fluctuating crosstalk, wherein low power mode scaling of the transmitted signal is performed prior to the pre-coding; and
providing instructions for adjusting settings for a transmit power spectral density and an allocation of power and bits among tones of the transmitted signal, wherein the adjusting is based on a noise threshold,
wherein the plurality of lines are associated with a cable, wherein the processor selects at least some of the plurality of lines of the cable for performance of the pre-coding of the transmitted signal, and wherein the processor selects the at least some of the plurality of lines based on lines with a greatest crosstalk coupling and frequencies with the greatest crosstalk coupling.

10. The system of claim 9, wherein the crosstalk coupling characteristics are not determined based on monitoring changes to signal-to-noise ratio-vs-frequency information associated with other lines of the plurality of lines.

11. The system of claim 9, wherein the operations further comprise:
monitoring the plurality of modems in the digital subscriber line system for transitioning between the full power mode and the low power mode, wherein the providing of the crosstalk coupling characteristics to the modem of the plurality of modems enables processing a received signal along a line of the plurality of lines, the processing being performed based on the crosstalk coupling characteristics, wherein the processing of the received signal reduces effects of fluctuating crosstalk.

12. The system of claim 9, wherein the pre-coding is further performed based on temporal characteristics associated with the low power mode.

13. The system of claim 9, wherein the pre-coding is based on quadrature amplitude modulation constellation points.

14. The system of claim 9, wherein the pre-coding of the transmitted signal is for a transmission during the low power mode.

15. The system of claim 9, wherein the operations further comprise:

monitoring for a reduction in fluctuating crosstalk for the digital subscriber line system and disabling the low power mode for some of the modems of the plurality of modems based on a detection of the reduction.

16. The system of claim 15, wherein the monitoring for the reduction in fluctuating crosstalk is based on coding errors.

17. A network device of a digital subscriber line system, the network device comprising:

a memory that stores computer instructions; and a processor coupled with the memory, wherein the processor, responsive to executing the computer instructions, performs operations comprising:

receiving crosstalk coupling characteristics associated with a plurality of lines of the digital subscriber line system, the network device being connected to a line of the plurality of lines, wherein the crosstalk coupling characteristics are determined according to a change in a transmitted signal amplitude that results from multiple transitions between a full power mode and a low power mode, wherein the change in the transmitted signal amplitude is determined by performing measurements at neighboring lines of the plurality of lines when one of a plurality of modems connected to one of the plurality of lines is in the full power mode and other modems of the plurality of modems connected with the neighboring lines are in the low power mode, wherein a determining of the crosstalk coupling characteristics comprises repeating the performing of the measurements for each of the plurality of modems in the full power mode; and performing pre-coding of a signal to be transmitted, the pre-coding being performed based on the crosstalk coupling characteristics, wherein the pre-coding of the transmitted signal reduces effects of fluctuating crosstalk, wherein the plurality of lines are associated with a cable, wherein a portion of the plurality of lines of the cable is selected for performance of the pre-coding of the transmitted signal according to lines with a greatest crosstalk coupling and frequencies with the greatest crosstalk coupling, and wherein settings for a transmit power spectral density, a signal-to-noise ratio margin, an allocation of power and bits among tones of the transmitted signal or a combination thereof are adjusted based on a noise threshold.

18. The network device of claim 17, wherein the pre-coding is based on quadrature amplitude modulation constellation points.

19. The network device of claim 17, wherein the pre-coding is further performed based on temporal characteristics associated with the low power mode.

20. The network device of claim 17, wherein the crosstalk coupling characteristics are determined based on the change in the transmitted signal amplitude and are not determined based on monitoring changes to signal-to-noise ratio-vs-frequency information associated with other lines of the plurality of lines.

* * * * *